United States Patent

[11] 3,583,749

| [72] | Inventor | John C. Hopkins |
| | | 2649 Santa Barbara Drive, Bethel Park, Pa. 15102 |
| [21] | Appl. No. | 742,666 |
| [22] | Filed | July 5, 1968 |
| [45] | Patented | June 8, 1971 |

[54] ROPE ASSEMBLY
5 Claims, 6 Drawing Figs.

[52] U.S. Cl. .......... 294/74, 24/123.5, 280/480, 294/78, 124/30
[51] Int. Cl. .......... B60d 1/18, B66c 1/14, F16g 11/00
[50] Field of Search .......... 294/71, 74—77, 83, 84, 86, 86 CG, 78; 124/30 A; 24/123.5; 280/480

[56] References Cited
UNITED STATES PATENTS

| 159,864 | 2/1875 | Topliff .......... | 294/78X |
| 802,815 | 10/1905 | Lau .......... | 294/78 |
| 1,021,564 | 3/1912 | Warnitz .......... | 294/78 |
| 1,243,337 | 10/1917 | O'Connell .......... | 24/123.5 |
| 1,606,898 | 11/1926 | Robinson .......... | 294/78 |
| 2,555,430 | 6/1951 | Weeks .......... | 294/78X |
| 3,464,046 | 9/1969 | Welton .......... | 294/84X |
| 338,216 | 3/1886 | Atwood .......... | 124/30AUX |
| 757,117 | 4/1904 | Howland .......... | 294/82 |
| 1,176,110 | 3/1916 | Uhlig .......... | 294/82X |
| 1,405,052 | 1/1922 | Maher .......... | 294/74 |
| 1,967,102 | 7/1934 | Schlegel .......... | 124/30AUX |
| 2,549,382 | 4/1951 | Mitterway .......... | 124/30AUX |
| 2,921,572 | 1/1960 | Miller et al. .......... | 124/30AUX |

FOREIGN PATENTS

| 391,694 | 5/1933 | Great Britain .......... | 24/123.5 |

OTHER REFERENCES
Publication of Samson Cordage Works, Boston 10, Mass.

*Primary Examiner*—Harvey C. Hornsby
*Assistant Examiner*—W. Scott Carson
*Attorney*—Oberlin, Maky, Donnelly and Renner

ABSTRACT: A flexible braided rope of tubular cross section having one end inserted into the middle or completely through the strands adjacent such one end to form a loop. One or more hooks may be provided on the loop to facilitate attachment of the rope assembly to an object such as the bumper of an automobile.

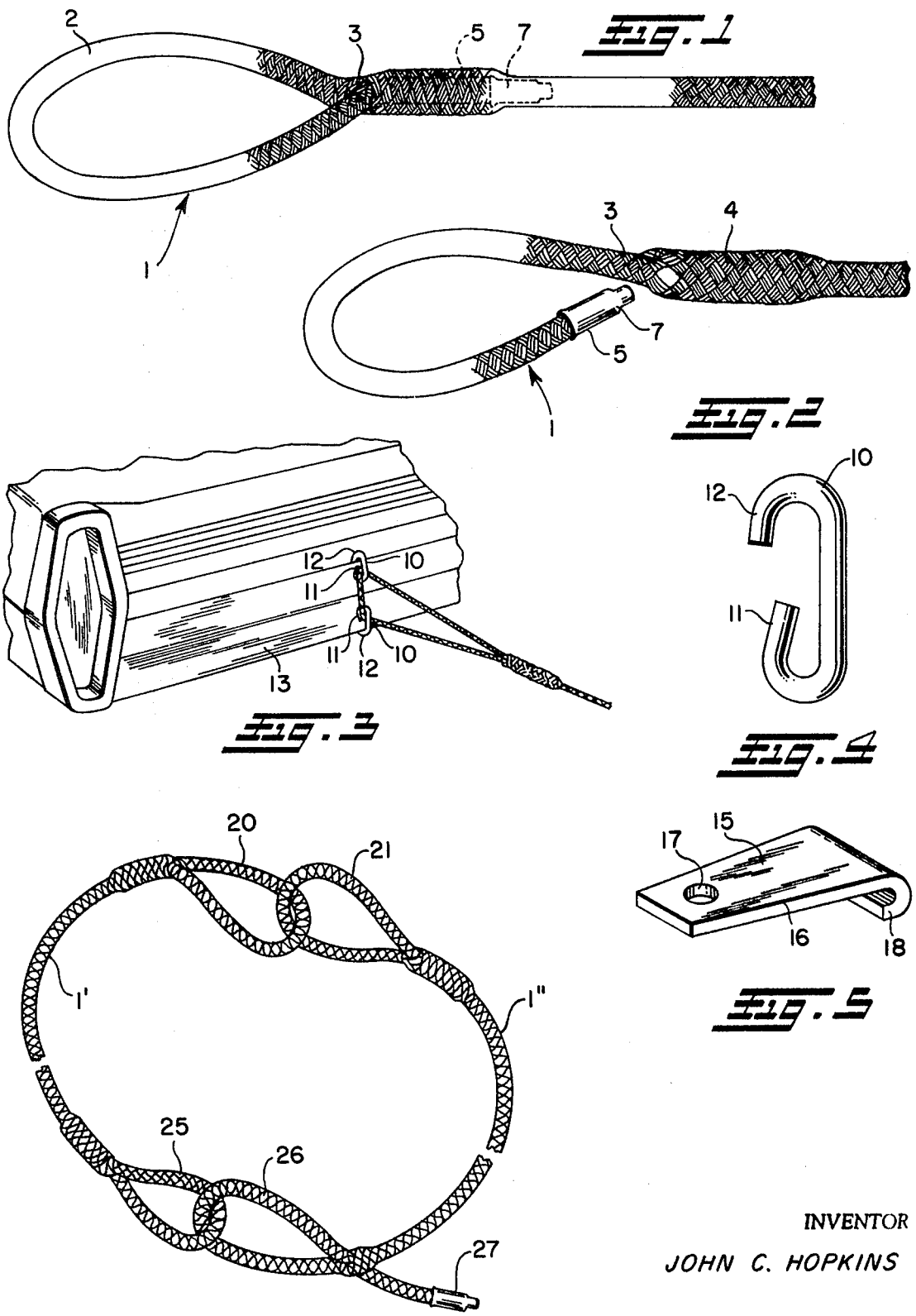
INVENTOR
JOHN C. HOPKINS

ROPE ASSEMBLY

BACKGROUND OF THE INVENTION

The present invention relates generally as indicated to a rope assembly formed as by providing a loop in one or both ends thereof to facilitate attachment of the rope assembly to objects to be towed or lifted or attachment of two ends together for increasing the length of the rope assembly or tying the rope assembly around an object.

There are a multitude of uses for a rope assembly having a loop at one or both ends, examples of which are indicated above, but the average person is not able to tie a knot which he is sure will hold for the intended purpose and yet can readily be untied and retied whenever desired.

SUMMARY OF THE INVENTION

With the foregoing in mind, it is a principal object of this invention to provide a rope assembly in which a secure loop may readily be formed and removed without having to tie any knots.

A further object of this invention is to provide such a rope assembly in which the size of the loop may be readily varied.

Still another object is to provide such a rope assembly with one or more hooks slidable along the loop to facilitate attachment of the rope assembly to an object such as the bumper of an automobile.

These and other objects of the present invention may be achieved as by using a flexible braided rope of tubular cross section thus permitting the strands to be pushed together to provide an opening therebetween for insertion of the end of the rope into its center or completely therethrough, whereupon when a pulling force is applied to the loop, the strands will grip the rope end to lock the same in place, the greater the pulling force, the greater the grip. To remove the loop, it is only necessary to release the tension on the rope and push the strands together as when making the loop. Slidable hooks may be provided on the loop to facilitate attachment to an object.

To the accomplishment of the foregoing and related ends, the invention, then, comprises the features hereinafter fully described and particularly pointed out in the claims, the following description and the annexed drawing setting forth in detail certain illustrative embodiments of the invention, these being indicative, however, of but a few of the various ways in which the principles of the invention may be employed.

BRIEF DESCRIPTION OF THE DRAWING

In the annexed drawing:

FIG. 1 is an isometric view of a portion of a rope assembly in accordance with this invention having a loop at one end formed as by inserting the end of the rope between the strands into its center adjacent such one end;

FIG. 2 is an isometric view of a portion of a rope assembly showing the rope strands pushed together adjacent one end to facilitate insertion of the end of the rope into its center as in FIG. 1;

FIG. 3 is an isometric view of a portion of the rope assembly of FIG. 1 but having a pair of hooks slidable along the loop to facilitate attachment of the rope assembly to the bumper of an automobile;

FIG. 4 is an enlarged isometric view of one of the hooks of FIG. 3;

FIG. 5 is an isometric view of another form of hook which may be substituted for the hook of FIG. 4; and FIG. 6 is an isometric view of a pair of ropes connected together.

DESCRIPTION OF THE PREFERRED EMBODIMENTS

As shown in FIGS. 1 and 2, the rope assembly 1 of the present invention is of a braided construction, cylindrical in cross section and having a loop 2 in one or both ends. The rope strands 3 may be of any suitable flexible, high strength material such as polypropylene, and the loop 2 may be of any desired size which is formed without tying as by grasping the rope with both hands in the region 4 where the end 5 of the rope is to be secured and pushing the rope strands together to loosen the strands as shown in FIG. 2 for ready insertion of the terminus of end 5 into the center of the rope. A plastic or metal tip 7 may be provided on such rope end 5 to facilitate insertion between the strands and prevent unraveling of the rope. The end 5 should desirably be worked into the center of the rope approximately 4 inches to insure against inadvertent pullout.

Now, if a tension load is applied to the loop, the strands will be stretched, thus causing a reduction in the diameter of the rope and a locking of the strands on the rope end 5 to preclude withdrawal, much like the Chinese finger braid which tightly grips the fingers when inserted into its ends and the fingers are pulled apart. The greater the tension applied to the loop, the stronger the grip exerted by the strands on the end of the rope, thus precluding pullout even under high tension loads. To disconnect the loop 2, it is only necessary to relax the tension force and urge the strands of the rope together in the region 4 as when making the loop so that the strands release their grip on the rope end.

Thus, it can now be seen that a loop 2 of any desired size may be readily made in one or both ends of the rope assembly without having to tie any knots, and the loop may be formed after passing the rope end around an object to be pulled or lifted, or round wire clips 10 of spring steel or the like having hooks 11 and 12 on opposite ends may be used in conjunction with the rope assembly to attach the same to an object such as the bumper 13 of an automobile as shown in FIG. 3. Preferably, the clips 10 are hooked over the top and bottom edges of the bumper before forming the loop so that its size may be selected in accordance with the size of the bumper. After the loop is formed, the rope should be adjusted to center the tension on the clips. The other end of the rope assembly may similarly be attached to the bumper of another automobile, or the loop itself may be formed directly around the bumper or other object, depending on what is practical or expeditious under the circumstances.

In FIG. 5 there is shown another form of clip 15 which may be used in place of the clips 10 of FIGS. 3 and 4. The clip 15 may be formed from a flat metal or plastic strip 16 having a hole 17 in one end for threading onto the end of the rope assembly prior to formation of the loop and having a hook 18 at the other end which is adapted to engage a bumper or other such object, similar to the hooks 12 on the clips 10.

Although the rope assembly may be of any desired length, should it be found that the rope assembly is not long enough for a particular purpose, it will be readily apparent that two or more ropes may be connected together in the manner shown in FIG. 6, as by forming a first loop 20 at the end of one rope 1', inserting the end of a second rope 1" through the first loop 20 and making a second loop 21 with the end of the second rope 1" to splice the two ropes together. Where one or more of such ropes is to be wrapped around an object as for example to secure luggage to the roof of an automobile, a loop 25 should be formed in one end of the rope assembly 1', and the other end 26 of the same or a different rope depending on whether one or more ropes are being used, should be passed through such loop 25, after which the strands in such other end 26 should be pushed together in the appropriate place to permit insertion of the tip 27 completely through the rope so that it may be pulled hard to lock the rope assembly in place.

I, therefore, particularly point out and distinctly claim as my invention:

1. A tow rope assembly for attachment to automobile bumpers and the like comprising a flexible braided rope having the terminus of one end inserted between the rope strands into the center of the rope along the longitudinal axis of said rope adjacent such one end to form a loop with said terminus and the portion of said rope immediately adjacent thereto being retained in the center of said rope against pullout by the rope strands which tightly grip said terminus and said portion when a tension force is applied to said rope, the size of said loop being adjustable by varying the location at which said terminus of said one end of said rope is inserted into said center of said rope along the length thereof, and a pair of clips slidable on said rope to facilitate attachment of said clip to spaced-apart potions of a bumper which may vary in size.

2. The rope assembly of claim 1, wherein said clips have hooks on opposite ends to facilitate attachment to said loop and such bumper, respectively, and removal therefrom.

3. The rope assembly of claim 1, wherein said clips are formed from a rigid flat strip having a hole in one end for threading onto the end of the rope assembly prior to formation of the loop, and having a hook at the other end to facilitate attachment to such bumper and removal therefrom.

4. A rope assembly comprising a flexible braided rope of tubular cross section having the terminus of one end inserted between the rope strands and into the center of said rope along the longitudinal axis of said rope adjacent such one end to form a loop with said terminus and the portion of said rope immediately adjacent thereto being retained in the center of said rope against pullout by the rope strands which tightly grip said terminus and said portion when a tension force is applied to said rope, the terminus of the other end of said rope being inserted between the rope strands and extending completely through the rope adjacent such other end to form a second loop which may be pulled tightly by grasping and pulling on such other end.

5. A rope assembly comprising a flexible braided rope having the terminus of one end inserted between the rope strands and into the center of said rope along the longitudinal axis of said rope adjacent such one end to form a first loop with said terminus and the portion of said rope immediately adjacent thereto being retained in the center of said rope against pullout by the rope strands which tightly grip said terminus and said portion when a tension force is applied to said rope, and the terminus of the other end of said rope being inserted between the rope strands and extending completely through the rope adjacent such other end to form a second loop which may be pulled tight by grasping and pulling on such other end, and another flexible braided rope having the terminus of one end passing through a loop in the first-mentioned rope and inserted between the rope strands adjacent such one end of said another rope to form a loop in said another rope.